United States Patent
Chickermane et al.

(10) Patent No.: US 10,331,506 B1
(45) Date of Patent: Jun. 25, 2019

(54) SOC TOP-LEVEL XOR COMPACTOR DESIGN TO EFFICIENTLY TEST AND DIAGNOSE MULTIPLE IDENTICAL CORES

(71) Applicant: Cadence Design Systems, Inc., San Jose, CA (US)

(72) Inventors: Vivek Chickermane, Slaterville Springs, NY (US); Christos Papameletis, Binghamton, NY (US); Krishna Vijaya Chakravadhanula, Vestal, NY (US); Brian Edward Foutz, Charlottesville, VA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 47 days.

(21) Appl. No.: 15/639,092

(22) Filed: Jun. 30, 2017

(51) Int. Cl.
| | | |
|---|---|---|
| *G01R 31/28* | (2006.01) | |
| *G06F 11/07* | (2006.01) | |
| *G06F 11/30* | (2006.01) | |

(52) U.S. Cl.
CPC ...... *G06F 11/0724* (2013.01); *G06F 11/0715* (2013.01); *G06F 11/0757* (2013.01); *G06F 11/30* (2013.01)

(58) Field of Classification Search
CPC .. G01R 31/44; G01R 31/28; G01R 31/31703; G01R 31/318547; G01R 31/2815; G01R 31/318335; G01R 31/318522; G01R 31/3187; G06F 17/5045; G06F 2217/14; G06F 11/277; G06F 11/22; G06F 11/27; G06F 11/0724; G06F 11/0715; G06F 11/0757; G06F 11/30
See application file for complete search history.

(56) References Cited

U.S. PATENT DOCUMENTS

| | | | |
|---|---|---|---|
| 7,925,947 B1* | 4/2011 | Touba ............ | G01R 31/318547 714/726 |
| 8,533,646 B1* | 9/2013 | Onozaki ............. | G06F 17/5072 716/110 |
| 9,404,969 B1* | 8/2016 | Keller .............. | G01R 31/31703 |
| 2005/0055613 A1* | 3/2005 | Mitra ............. | G01R 31/318547 714/726 |
| 2010/0192030 A1* | 7/2010 | Kapur ............ | G01R 31/318547 714/726 |
| 2010/0218061 A1* | 8/2010 | Sinanoglu ...... | G01R 31/318547 714/731 |
| 2014/0095101 A1* | 4/2014 | Gizdarski ...... | G01R 31/318335 702/120 |

* cited by examiner

*Primary Examiner* — Guerrier Merant
(74) *Attorney, Agent, or Firm* — Tarolli, Sundheim, Covell & Tummino LLP

(57) ABSTRACT

Systems disclosed herein provide for efficient top-level compactors for systems on a chip (SoCs) with multiple identical cores. Embodiments of the systems provide for compactors with a time-skewed assignment configuration, compactors with a space-skewed assignment configuration, compactors with time/space-skewed assignment configuration, and compactors that can selectively switch between the time/space-skewed assignment configuration and a symmetric assignment configuration.

17 Claims, 4 Drawing Sheets

SOC TOP-LEVEL XOR COMPACTOR DESIGN TO EFFICIENTLY TEST AND DIAGNOSE MULTIPLE IDENTICAL CORES

TECHNICAL FIELD

The present application relates to efficient top-level compactors for systems on a chip including multiple identical cores.

BACKGROUND

Many modern devices may include a system on a chip (SoC) with multiple cores. Traditionally, the multiple cores are identical to each other. Such cores can include millions of logic gates. In order to test such a large number of logic, each core may include its own compression macro, e.g., a compressor-decompressor (CoDec). The decompressor portion of the CoDec decompresses the received test data and the compressor portion compresses the responses of the applied test data. Further, each of the cores of the SoC receives the same test data. Also, one or more cores can be tested at a time.

If only one core of the SoC is tested at a time, the other cores remain inactive. As such, during the test of the active core, the CoDec will (i) decompress the test data received at the scan in (SI) of the SoC and (ii) output the compressed responses to the scan out (SO) of the SoC. However, if more than one core is tested, a compactor is required to compact the compressed responses from each of the cores before they are output to the SO. One way to compact the compressed responses from the multiple cores is to assign each ith output of a core to a corresponding ith exclusive OR (XOR) logic gate of the compactor. Accordingly, the ith output of any core will be XORed with the respective ith outputs of the other cores. This configuration is known as symmetric assignment.

One of the benefits of symmetric assignment is an inherent X-tolerance. "X-states" (e.g., unknown logic states) can occur for a variety of reasons, such as: (1) the automatic test pattern generation (ATPG) cannot accurately model certain logic modules and the un-modeled logic gets captured at a scan element (e.g., scan flip-flop), (2) internal three-state logic that could go to high-Z (i.e., high impedance), (3) uninitialized non-scan flip-flop/latches that cannot be reset prior to scan test application, (4) unknown RAM output (e.g., output of RAM may be unknown if not all of the RAM bits have time to get to logical "0" after a chip powers on), (5) a third-party vendor does not provide enough data to determine all of the possible outputs after a chip is powered on and, thus, X-states have to be assumed for the undetermined outputs, (6) some of the gates being tested are fed by analog logic (i.e., which does not use logical "1s" and "0s"), and (7) at-speed delay tests in which not all of the paths can meet the desired timings. Further, a single X-state found within a compression environment will likely combine with other non X-states (i.e., known values) and, thus, corrupt those values before they can be observed at the output of the compression. As such, as the X-states are shifted through the compression logic, the compression efficiency will be adversely affected, resulting in a higher pattern count and lower test coverage. With symmetric assignment, because the cores are identical to each other, the X-states can be isolated to a specific XOR logic gate of the compactor.

However, the symmetric assignment configuration can also lead to the masking of multiple identical faults. For example, assuming an ith output of each of the cores outputs a "0" (e.g., associated with a faulty response) or a "1" (e.g., associated with a good response), if there are an even number of cores and all of them have an identical fault, the output of the corresponding ith XOR logic gate will be a "0" in both scenarios (e.g., all "0" inputs or all "1" inputs). As such, it will be unknowable if the corresponding device is faulty or not.

Accordingly, there is a need for an efficient top-level compactor for a SoC with multiple identical cores, which is both X-tolerant and can handle multiple identical faults.

DESCRIPTION OF EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

One aspect of the present disclosure is to provide an efficient top-level compactor for a SoC with multiple identical cores, which is both X-tolerant and can handle multiple identical faults. The systems herein address at least one of the problems discussed above.

According to an embodiment, a compactor for a SoC with a plurality of identical cores includes a plurality of XOR logic gates configured to receive respective outputs from each of the cores, wherein (i) an ith output of each of the cores is input to a corresponding ith XOR logic gate, wherein i is an integer greater than 0, and (ii) each input of a respective XOR logic gate is associated with a distinct time delay.

According to an embodiment, a compactor for a SoC with a plurality of identical cores includes a plurality of XOR logic gates configured to receive respective outputs from each of the cores, wherein each input of a respective XOR logic gate is associated with a distinct output location of a respective core.

According to an embodiment, a compactor for a SoC with a plurality of identical cores includes a plurality of XOR logic gates configured to receive respective outputs from each of the cores, each of the XOR logic gates including a plurality of multiplexers, wherein each of the multiplexers (i) receives, at a first input, a first output of a respective core, and at a second input, another output of the respective core and (ii) outputs one of the first and second inputs to the XOR logic gate based on a received control signal.

Figure 1A:
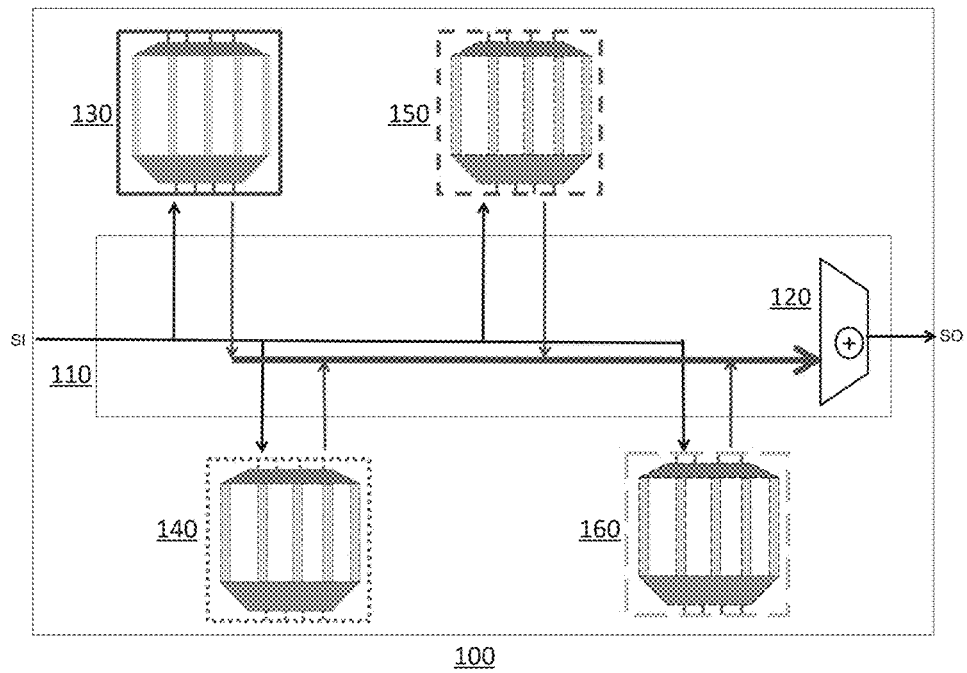
FIG. 1A illustrates an example embodiment of a SoC including multiple cores.

FIG. 1A illustrates an example embodiment of a SoC including multiple cores. As depicted in the figure, system on a chip (SoC) 100 includes an integrator 110, a compactor 120, and cores 130, 140, 150, and 160. In an embodiment, the integrator 110 receives SI inputs from a tester (not shown) and outputs, via the compactor 120, SO outputs. In an embodiment, the integrator 110 feeds the received SI inputs to each of the cores 130, 140, 150, and 160. Further, the integrator 110 also receives the corresponding compressed responses from each of the cores 130, 140, 150, and 160. In an embodiment, the compactor 120 compacts the corresponding compressed responses from each of the cores 130, 140, 150, and 160. In an embodiment, the compactor 120 is comprised of a plurality of exclusive OR (XOR) logic gates. In an embodiment, each of the cores 130, 140, 150, and 160 also includes a corresponding test interface macro (TIM) (not shown). In an embodiment, the TIMs interact with the integrator 110 during test of the respective cores. In an embodiment, the SoC 100 also includes some glue logic (not shown) at the top level that integrates the functioning of the cores 130, 140, 150, and 160, and the integrator 110 with the SoC 100. Further, in an embodiment, the glue logic can also be used to integrate other interfaces (e.g., Bluetooth, GPS, etc.) into the SoC 100.

Figure 1B:
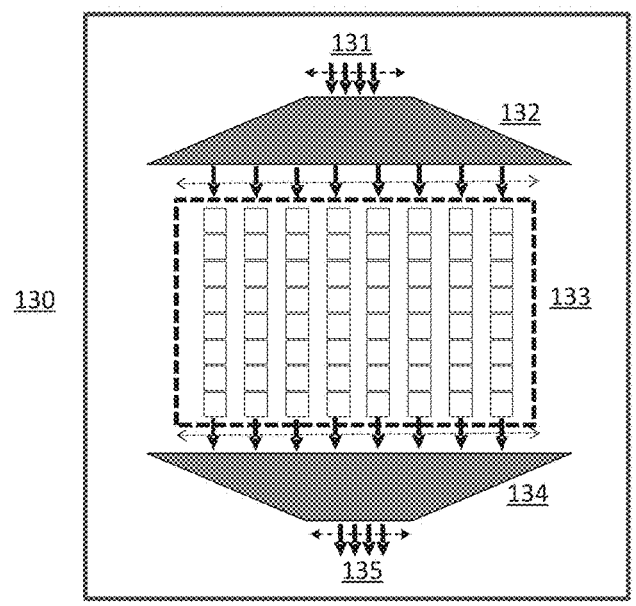
FIG. 1B illustrates an example embodiment of the elements of a core depicted in FIG. 1A.

FIG. 1B illustrates an example embodiment of the elements of a core depicted in FIG. 1A. As depicted in the figure, core 130 includes M scan-in pins 131, decompressor 132, test cube 133, compressor 134, and K scan-out pins 135. In an embodiment, the decompressor 132 and the compressor 134 are part of the same compression macro of the core 130. Further, the M scan-in pins 131 are fed test data from the SI via the integrator 110. The decompressor 132 decompresses the test data and outputs the decompressed test data to the N scan channels of the test cube 133. The decompressed test data is then applied to the logic associated with the test cube 133. The scan channels then output the corresponding responses to the compressor 134, where they are compressed and output to the compactor 120 via the K scan-out pins 135. In an embodiment, cores 140, 150, and 160 are identical in structure to core 130.

Figure 2A:
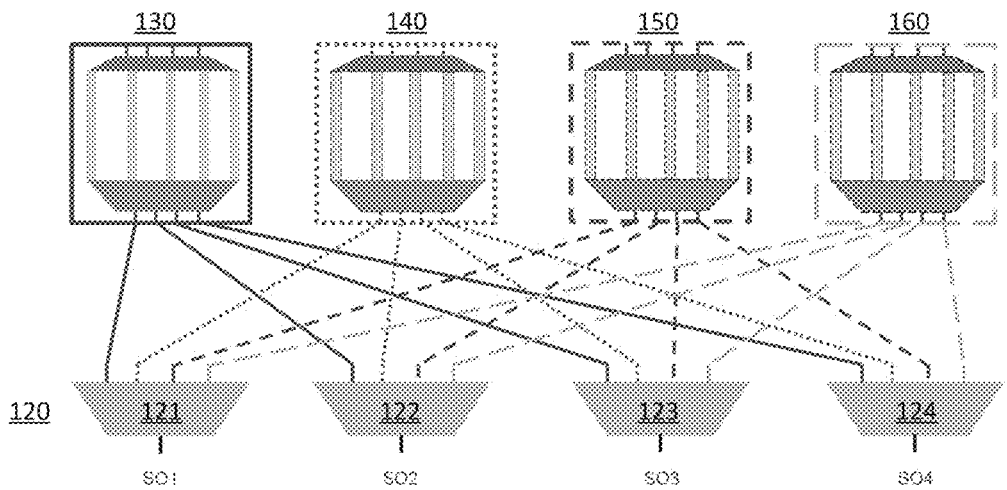
FIG. 2A illustrates an example embodiment of a compactor with a symmetric assignment configuration.

FIG. 2A illustrates an example embodiment of a compactor with a symmetric assignment configuration. As depicted in the figure, the compactor 120 is comprised of a plurality of XOR logic gates 121, 122, 123, and 124. Further, each of the XOR logic gates 121, 122, 123, and 124 receives a plurality of inputs (e.g., 4 inputs) and outputs a single output (e.g., SO1, SO2, SO3, or SO4). In an embodiment, the outputs SO1, SO2, SO3, and SO4 correspond to the compacted SO outputs of FIG. 1A. Further, as discussed above, with a symmetric assignment configuration, each ith output of cores 130, 140, 150, and 160 is assigned to a corresponding ith XOR logic gate of the compactor 120. As such, in an embodiment, (i) each of the first outputs of cores 130, 140, 150, and 160 is input to the XOR logic gate 121, (ii) each of the second outputs of cores 130, 140, 150, and 160 is input to the XOR logic gate 122, (iii) each of the third outputs of cores 130, 140, 150, and 160 is input to the XOR logic gate 123, and (iv) each of the fourth outputs of cores 130, 140, 150, and 160 is input to the XOR logic gate 124. As described above, one of the benefits of symmetric assignment is that X-states can be isolated to a specific XOR logic gate of the compactor. For example, if there was an X-state at each of the first outputs of the cores 130, 140, 150, and 160, the X-state would only corrupt the SO output of the XOR logic gate 121 (i.e., SO1). On the other hand, outputs SO2, SO3, and SO4 would remain uncorrupted since the X-state did not occur in any of the other respective outputs of the cores 130, 140, 150, and 160. Further, as also described above, the symmetric assignment configuration can also lead to the masking of multiple identical faults. For example, in the case of an even number of cores (as depicted in FIG. 2A), the SO output of any of the XOR logic gates 121, 122, 123, and 124 would be "0" if all of the inputs to the XOR logic gate were the same. For example, if each of the inputs to the XOR logic gate 121 were a "0," the output SO1 would also be "0." However, if each of the inputs to the XOR logic gate 121 were a "1," the output SO1 would still be "0." As such, it would unknowable if there was a fault associated with the first output of each of the cores 130, 140, 150, and 160 (and, therefore, the cores themselves).

Figure 2B:
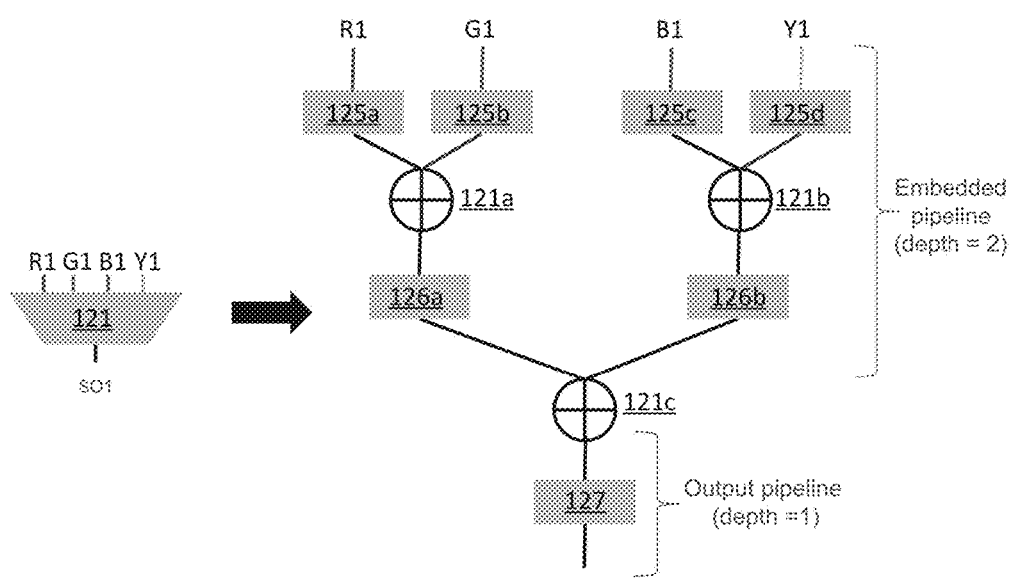
FIG. 2B illustrates an example embodiment of an XOR utilized in the compactor of FIG. 2A.

FIG. 2B illustrates an example embodiment of an XOR utilized in the compactor of FIG. 2A. As depicted in the figure, the XOR logic gate 121 can include additional XOR logic gates 121a, 121b, and 121c, as well as delay pipelines 125a, 125b, 125c, 125d, 126a, 126b, and 127. In an embodiment, each of the delay pipelines 125a, 125b, 125c, 125d, 126a, 126b, and 127 may be comprised of a single flip-flop and may be associated with a time delay of one clock cycle. As further depicted in the figure, (i) the first output of the core 130 (i.e., R1) is input to the delay pipeline 125a, (ii) the first output of the core 140 (i.e., G1) is input to the delay pipeline 125b, (iii) the first output of the core 150 (i.e., B1) is input to the delay pipeline 125c, (iv) the first output of the core 140 (i.e., Y1) is input to the delay pipeline 125d. Further, in an embodiment, the XOR logic gate 121a receives, as inputs, the values at the delay pipelines 125a and 125b, and outputs the resulting value to the delay pipeline 126a. Similarly, the XOR logic gate 121b receives, as inputs, the values at the delay pipelines 125c and 125d, and outputs the resulting value to the delay pipeline 126b. After which, the XOR logic gate 121c receives, as inputs, the values at the delay pipelines 126a and 126b, and outputs the resulting value to the delay pipeline 127. In an embodiment, the combination of delay pipelines 125a, 125b, and 126a, as well as the combination of delay pipelines 125c, 125d, and 126b may correspond to embedded pipelines, each embedded pipeline being associated with a pre-determined depth. For example, FIG. 2B depicts an embedded pipeline depth of two. Similarly, the delay pipeline 127 may correspond to an output pipeline having a depth of one. The function of the delay pipelines is to standardize the timing of the data coming in from cores located at different distances from the compactor. Therefore, data coming in from cores located further from the compactor (i.e., longer wires) will have a similar timing in the XOR logic gate to data coming in from cores located closer to the compactor (i.e., shorter wires). Specifically, because the same propagation delay (e.g., 1 clock cycle) associated with the delay pipelines is applied to data coming in from each of the cores, the corresponding data will be able to meet the proper timing for the logic being performed within the XOR logic gate 121 (e.g., XOR logic gate 121a, XOR logic gate 121b, and XOR logic gate 121c).

In an embodiment, XOR logic gates 122, 123, and 124 are similar in structure to XOR logic gate 121.

Figure 3A:
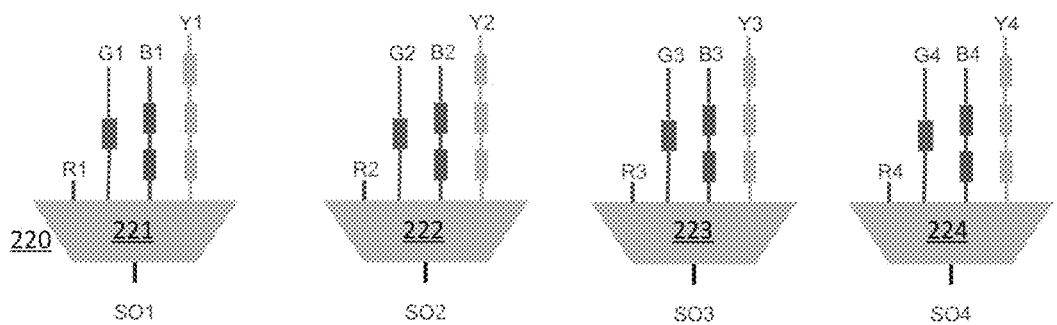
FIG. 3A illustrates an example embodiment of a compactor with a time-skewed assignment configuration.

FIG. 3A illustrates an example embodiment of a compactor with a time-skewed assignment configuration. As depicted in the figure, XOR logic gates 221, 221, 223, and 224 are similar to the symmetric assignment configuration illustrated in FIG. 2A except that each input of a respective XOR logic gate is associated with a distinct delay pipeline stage depth. In an embodiment, each delay pipeline stage may be comprised of a single flip-flop and may be associated with a time delay of one clock cycle. For example, (i) the inputs associated with core 130 (i.e., R1, R2, R3, R4) are associated with no delay pipeline stages (i.e., zero delay), (ii) the inputs associated with core 140 (i.e., G1, G2, G3, G4) are associated with a single delay pipeline stage (i.e., single clock cycle delay), (iii) the inputs associated with core 150 (i.e., B1, B2, B3, B4) are associated with two delay pipeline stages (i.e., two clock cycles delay), and (iv) the inputs associated with core 160 (i.e., Y1, Y2, Y3, Y4) are associated with three delay pipeline stages (i.e., three clock cycles delay). In an embodiment, inputs including delay pipeline stages are initialized with a value of "0" and maintain a value of "0" for the length of the respective time delay. For example, inputs G1, G2, G3, and G4 will be "0" for one clock cycle before the actual response values from the core 140 are input into the respective XOR logic gates. Similarly, inputs B1, B2, B3, and B4 will be "0" for two clock cycles before the actual response values from the core 150 are input into the respective XOR logic gates. Also, inputs Y1, Y2, Y3, and Y4 will be "0" for three clock cycles before the actual response values from the core 160 are input into the respective XOR logic gates. In an embodiment, similar to the symmetrical assignment configuration in FIG. 2A, the time-skewed assignment configuration also isolates X-states to a specific XOR logic gate of the compactor. In other words, the time-skewed assignment configuration is also X-tolerant. However, unlike the symmetrical assignment configuration in FIG. 2A, which masked multiple identical faults for an even number of cores, because each of the inputs to the XOR logic gate is associated with a distinct time delay, multiple identical faults (e.g., input values of all 0s or all 1s) will not propagate through the XOR logic gate at the same time. Therefore, the SO output can be relied upon to indicate whether the identical values are associated with a correct response or a faulty response. As such, the time-skewed assignment configuration is both X-tolerant and is able to handle multiple identical faults.

Figure 3B:
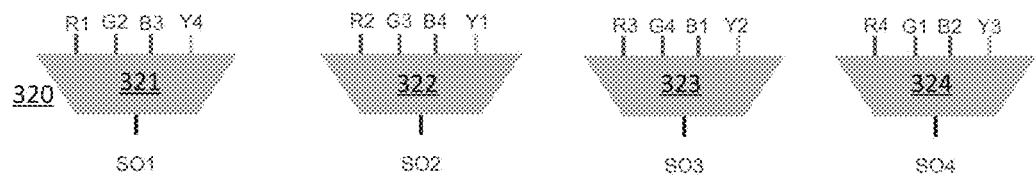
FIG. 3B illustrates an example embodiment of a compactor with a space-skewed assignment configuration.

FIG. 3B illustrates an example embodiment of a compactor with a space-skewed assignment configuration. As depicted in the figure, unlike the time-skewed assignment configuration, which was varied in time, the inputs to the XOR logic gate in a space-skewed assignment configuration are varied in location. Specifically, the location of an input to the XOR logic gate as it relates to a certain output of a core can be varied for each core. In an embodiment, the outputs of the core 130 can have a location skew of zero. For example, R1 is associated with the first input of the XOR logic gate 321, R2 is associated with the first input of the XOR logic gate 322, R3 is associated with the first input of the XOR logic gate 323, and R4 is associated with the first input of the XOR logic gate 324. Further, in an embodiment, the outputs of the core 140 can have a location skew of one. For example, G2 is associated with the second input of the XOR logic gate 321, G3 is associated with the second input of the XOR logic gate 322, G4 is associated with the second input of the XOR logic gate 323, and G1 is associated with the second input of the XOR logic gate 324. Further, in an embodiment, the outputs of the core 150 can have a location skew of two. For example, B3 is associated with the third input of the XOR logic gate 321, B4 is associated with the third input of the XOR logic gate 322, B1 is associated with the third input of the XOR logic gate 323, and B2 is associated with the third input of the XOR logic gate 324. Further, in an embodiment, the outputs of the core 160 can have a location skew of three. For example, Y4 is associated with the fourth input of the XOR logic gate 321, Y1 is associated with the fourth input of the XOR logic gate 322, Y2 is associated with the fourth input of the XOR logic gate 323, and Y3 is associated with the fourth input of the XOR logic gate 324. Therefore, each input of a respective XOR logic gate will be associated with a different output location of a respective core. Accordingly, in the event of multiple identical faults, the input values associated with the faults will not propagate through the same XOR logic gate. As such, multiple identical faults will not be masked in the space-skewed assignment configuration. On the other hand, X-states are no longer localized to a single XOR logic gate in the space-skewed assignment configuration and, therefore, the X-states may propagate through the other XOR logic gates. As mentioned previously above, anytime an X-state is combined with something else, the output of the combination will be an X-state. In other words, the SO output will be corrupted. Therefore, unlike the symmetric assignment configuration and the time-skewed assignment configuration, the space-skewed assignment configuration may not be X-tolerant.

Figure 3C:
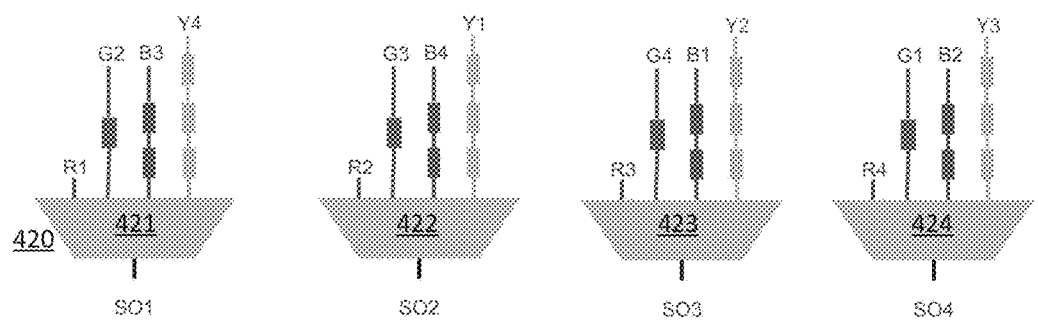
FIG. 3C illustrates an example embodiment of a compactor with a time/space-skewed assignment configuration.

FIG. 3C illustrates an example embodiment of a compactor with a time/space-skewed assignment configuration. Specifically, as depicted in the figure, the time/space-skewed assignment configuration combines the location skews of the compactor 320 in FIG. 3B with the delay pipeline stage depth of the compactor 220 in FIG. 3A. In an embodiment, the combination of the time and location skews localizes any potential X-states to a single XOR logic gate at a time. For example, if the X-states were associated with an ith output of each of the cores (e.g., R1, G1, B1, Y1), each X-state would occur consecutively in time: (i) the X-state at R1 would occur first and, therefore, only corrupt SO1, (ii) the X-state at G1 would occur one clock cycle after the X-state at R1 and, therefore, only corrupt SO4, (iii) the X-state at B1 would occur two clock cycles after the X-state at R1 and, therefore, only corrupt SO3, and (iv) the X-state at Y1 would occur three clock cycles after the X-state at R1 and, therefore, only corrupt SO2. As such, the time/space-skewed assignment configuration of FIG. 3C addresses the potential X-tolerance issues associated with the space-skewed assignment configuration of FIG. 3B.

Figure 3D:
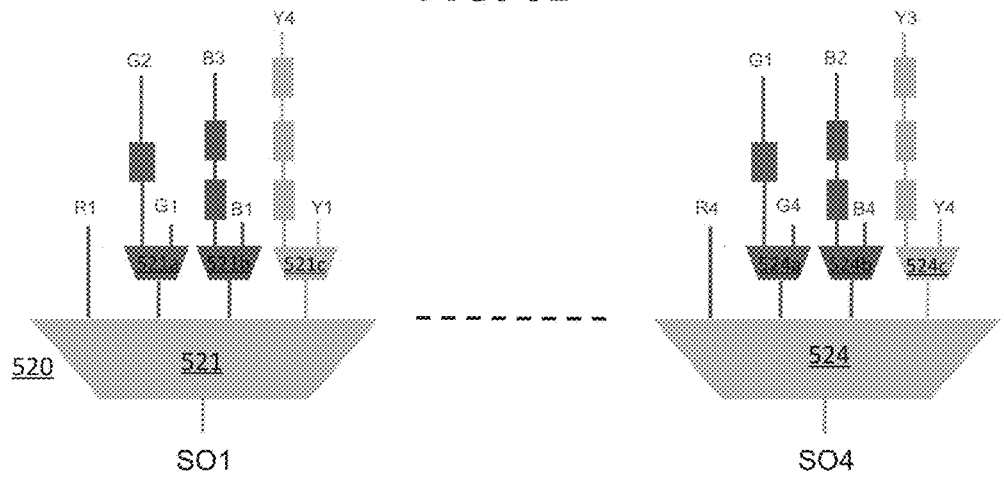
FIG. 3D illustrates an example embodiment of a compactor that can selectively switch between a time/space-skewed assignment configuration and the symmetric assignment configuration.

FIG. 3D illustrates an example embodiment of a compactor that can selectively switch between a time/space-skewed assignment configuration and the symmetric assignment configuration. As depicted in the figure, the compactor 520 includes a plurality of multiplexers associated with each of the XOR logic gates 521, 522, 523, and 524. For example, the XOR logic gate 521 includes multiplexers 521a, 521b, and 521c. In an embodiment, the multiplexers are utilized to selectively switch between the time/space-skewed assignment configuration of FIG. 3C and the symmetric assignment configuration of FIG. 2A. In an embodiment, the time/space-skewed assignment configuration is associated with a first input of each of the multiplexers and the symmetric assignment configuration is associated with a second input of each of the multiplexers. Further, in an embodiment, each of the multiplexers receives the same control signal. Accordingly, depending on the control signal, the XOR logic gates 521 to 524 can operate under the time/space-skewed assignment configuration or the symmetric assignment configuration. For example, (i) if the control signal is associated with the first input, the XOR logic gates 521 to 524 will operate under the time/space-skewed assignment configuration of FIG. 3C and (ii) if the control signal is associated with second input, the XOR logic gates 521 to 524 will operate under the symmetric assignment configuration of FIG. 2A. Further, in an embodiment, since the first inputs of each of the XOR logic gates 421 to 424 (i.e., the time/space-skewed assignment configuration) are equivalent to the first inputs of each of the XOR logic gates 121 to 124 (i.e., symmetric assignment configuration), the first inputs for each of the XOR logic gates 521 to 524 do not require a multiplexer. Instead, in an embodiment, the multiplexers are only utilized for the second, third, and fourth inputs of each of the XOR logic gates 521 to 524. In another embodiment, however, a multiplexer can be utilized for each input of the XOR logic gates 521 to 524.

Figure 3E:
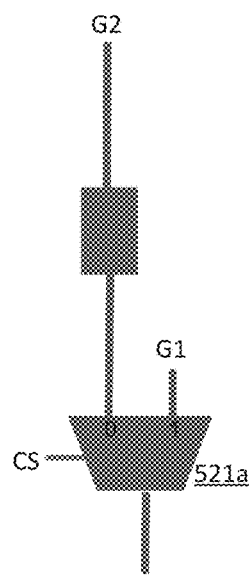
FIG. 3E illustrates an example embodiment of a multiplexer utilized in FIG. 3D.

FIG. 3E illustrates an example embodiment of a multiplexer utilized in FIG. 3D. Specifically, the figure depicts the elements of the multiplexer 521a. As depicted in the figure, the multiplexer 521a includes three inputs: a first input associated with a control signal value of "0," a second input associated with a control signal value of "1," and a control signal CS. As such, (i) if the control signal CS is "0," the first input will be selected and (ii) if the control signal is "1," the second input will be selected.

In the foregoing Description of Embodiments, various features may be grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Description of Embodiments, with each claim standing on its own as a separate embodiment of the invention.

Moreover, it will be apparent to those skilled in the art from consideration of the specification and practice of the present disclosure that various modifications and variations can be made to the disclosed systems without departing from the scope of the disclosure, as claimed. Thus, it is intended that the specification and examples be considered as exemplary only, with a true scope of the present disclosure being indicated by the following claims and their equivalents.

The invention claimed is:

1. A compactor for a system on a chip with a plurality of identical cores, the compactor comprising:
a plurality of exclusive OR (XOR) logic gates configured to receive respective outputs from each of the cores, wherein (i) an ith output of each of the cores is input to a corresponding ith XOR logic gate, wherein i is an integer greater than 0, and (ii) each respective core is associated with a distinct time delay and each output of the respective core is associated with a same time delay.

2. The compactor of claim 1, wherein each time delay is determined by a number of delay pipeline stages associated with each input of the respective XOR logic gate.

3. The compactor of claim 2, wherein each delay pipeline stage is comprised of a flip-flop with a time delay of one clock cycle.

4. The compactor of claim 1, wherein each of the cores includes at least one of a decompressor and a compressor.

5. The compactor of claim 1, wherein each XOR logic gate outputs a respective compacted output.

6. A compactor for a system on a chip with a plurality of identical cores, the compactor comprising:
a plurality of exclusive OR (XOR) logic gates configured to receive respective outputs from each of the cores, wherein each input of a respective XOR logic gate is associated with a distinct output location of a respective core, wherein each respective core is associated with a distinct time delay and each output of the respective core is associated with a same time delay.

7. The compactor of claim 6, wherein each input of the respective XOR logic gate is associated with the respective distinct time delay of each core.

8. The compactor of claim 7, wherein each time delay is determined by a number of delay pipeline stages associated with each input of the respective XOR logic gate, wherein each delay pipeline stage is comprised of a flip-flop with a time delay of one clock cycle.

9. The compactor of claim 6, wherein each of the cores includes at least one of a decompressor and a compressor.

10. The compactor of claim 6, wherein each XOR logic gate outputs a respective compacted output.

11. A compactor for a system on a chip with a plurality of identical cores, the compactor comprising:
a plurality of exclusive OR (XOR) logic gates configured to receive respective outputs from each of the cores, each of the XOR logic gates including a plurality of multiplexers, wherein each of the multiplexers (i) receives, at a first input, a first output of a respective core, and at a second input, another output of the respective core and (ii) outputs one of the first and second inputs to the XOR logic gate based on a received control signal.

12. The compactor of claim 11, wherein each of the first and second inputs is associated with a distinct time delay.

13. The compactor of claim 12, wherein a time delay associated with a first input of one of the multiplexers is distinct from another time delay associated with a first input of another of the multiplexers.

14. The compactor of claim 12, wherein each time delay is determined by a number of delay pipeline stages associated with each input of a respective multiplexer, wherein each delay pipeline stage is comprised of a flip-flop with a time delay of one clock cycle.

15. The compactor of claim 11, wherein each of the cores includes at least one of a decompressor and a compressor.

16. The compactor of claim 11, wherein each of the multiplexers receives a same control signal.

17. The compactor of claim 11, wherein each XOR logic gate outputs a respective compacted output.

* * * * *